United States Patent [19]

Ogawa

[11] Patent Number: 5,641,376

[45] Date of Patent: Jun. 24, 1997

[54] TIRE FORMING SYSTEM

[75] Inventor: Yuichiro Ogawa, Tokyo, Japan

[73] Assignee: Bridgestone Corporation, Tokyo, Japan

[21] Appl. No.: 578,023

[22] Filed: Dec. 26, 1995

[30] Foreign Application Priority Data

Dec. 27, 1994 [JP] Japan .................. 6-324543

[51] Int. Cl.[6] ................ B29D 30/20
[52] U.S. Cl. .......... 156/396; 156/405.1; 156/406.2; 156/417
[58] Field of Search ............ 156/396, 406.2, 156/111, 405.1, 408, 417

[56] References Cited

U.S. PATENT DOCUMENTS

| 3,532,577 | 10/1970 | Niclas et al. ............. 156/396 |
| 5,035,567 | 7/1991 | Davis . |
| 5,266,147 | 11/1993 | Lundeen ................. 156/396 |

FOREIGN PATENT DOCUMENTS

| 0326365 | 8/1989 | European Pat. Off. . |
| 0597125 | 5/1994 | European Pat. Off. . |
| 2-107432 | 4/1990 | Japan . |
| 743897 | 6/1980 | U.S.S.R. ............... 156/396 |
| 852629 | 8/1981 | U.S.S.R. ............... 156/406.2 |
| 1052419 | 11/1983 | U.S.S.R. ............... 156/406.2 |

Primary Examiner—Geoffrey L. Knable
Attorney, Agent, or Firm—Sughrue, Mion, Zinn, Macpeak & Seas

[57] ABSTRACT

A tire forming system includes a belt drum (1), a band drum (2) and a shaping drum (3), which are linearly arranged in order on a base (9) from its one end to the other. A first drive unit (5) is arranged at one end of the base (9) and coaxially supports and drives the belt drum (1) and the band drum (2). A second drive unit (8) is arranged at the other end of the base (9) and supports and drives the shaping drum (3). A transfer unit (10) is provided and transfer a belt-tread band (25) from the belt drum (1) and a carcass band (26) from the band drum (2) to the shaping drum (3) where they are assembled with each other to form a green tire (35).

9 Claims, 3 Drawing Sheets

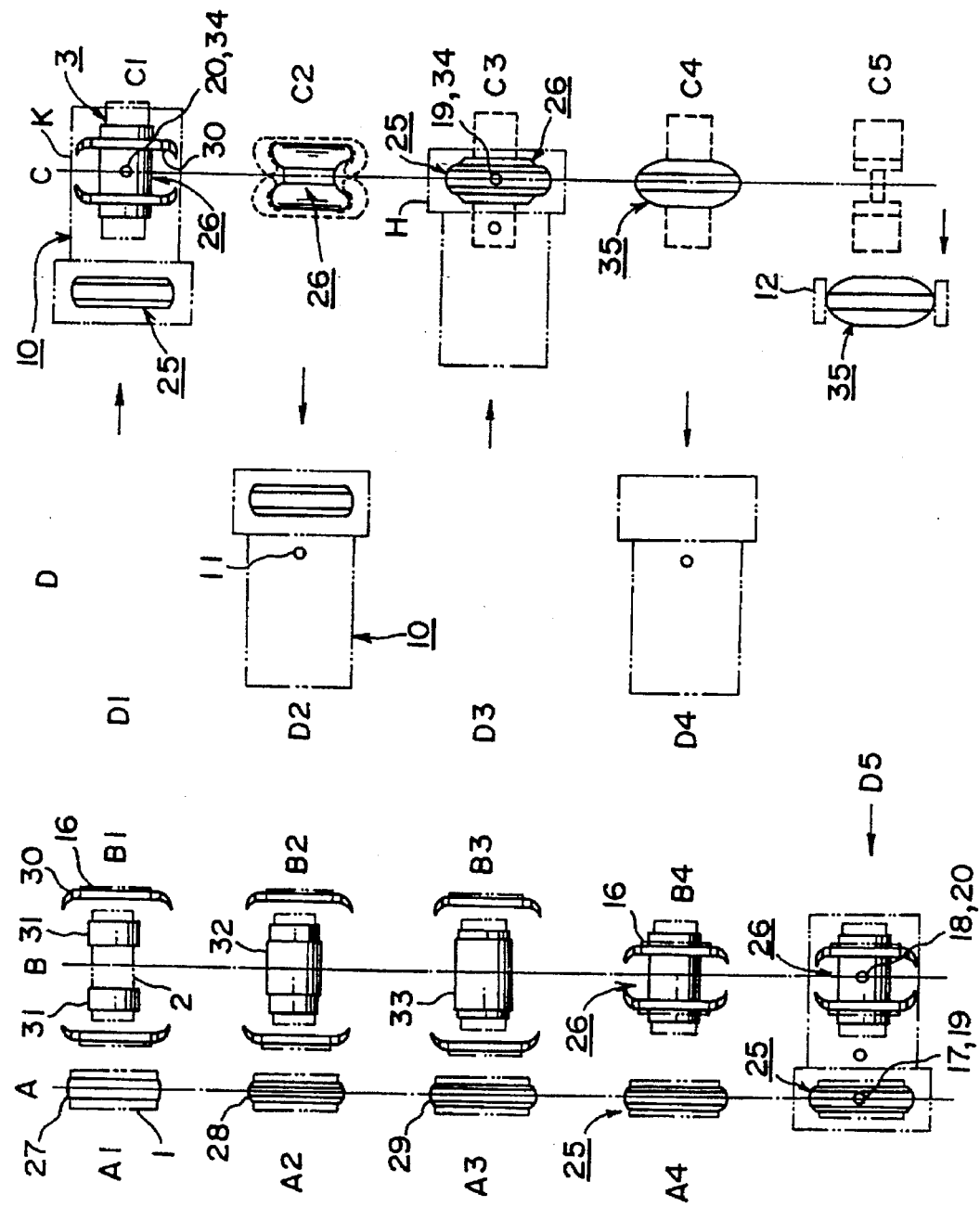
FIG._2

FIG_3
PRIOR ART
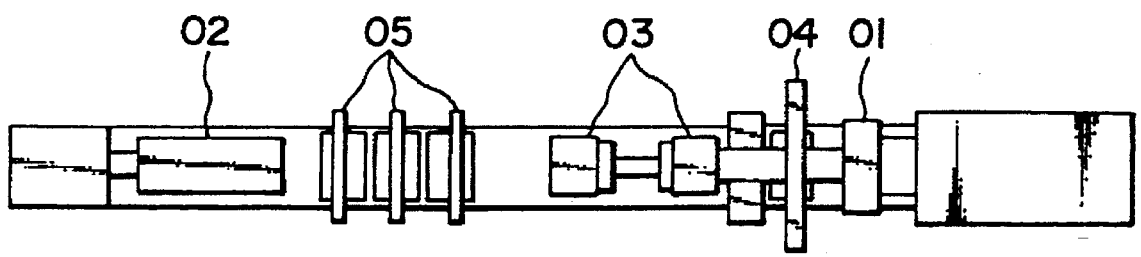

TIRE FORMING SYSTEM

BACKGROUND OF THE INVENTION

1. Field of the Invention

The present invention relates to a tire forming system wherein three forming drums, i.e. a belt drum, a band drum and a shaping drum, are linearly arranged with reference to each other. Specifically, the present invention pertains to a tire forming system which can be applied to produce large- and medium-sized steel radial tires used for a trucks, buses or light vans, and small-sized radial tires used for passenger cars.

2. Description of the Related Art

A tire forming system is disclosed in Japanese Patent Application Laid-Open Publication No. 2-107,432, wherein a belt drum, a band drum and a shaping drum are linearly arranged with reference to each other. Such a tire forming system is used to prepare a green tire to be subsequently vulcanized for forming a product tire. In this instance, various members are supplied from outside onto the belt drum and the band drum via respective servers such that a belt-tread band is formed on the belt drum and a carcass band is formed on the band drum. Furthermore, the belt-tread band from the belt drum and the carcass band from the band drum are automatically transferred onto the shaping drum where they are automatically assembled with each other.

All of the above-mentioned operations associated with the shaping drum are performed automatically, without manual operation to be performed by operators. Still, however, the operators must be engaged with various manual operations while frequently moving back and forth between the remaining two drums, i.e., the belt drum and the band drum. Such manual operations include, among other things, guiding the front ends of various members from the respective servers to predetermined positions on the belt drum and the band drum, cutting the members as they have been wound around the respective drums, and subsequently joining the front and rear ends of the wound members.

As particularly shown in FIG. 3, the belt drum 01 and the band drum 02 are separately arranged on both sides of the shaping drum 03. Thus, the operator must move over a substantial distance between the belt drum 01 and the band drum 02 whenever bonding and joining the members. In the case of forming system for large-sized tires, for example, the distance between the two drums may amount to as long as approximately four meters. On the other hand, a recent development in the green tire formation technology resulted in a shortened cycle time required for forming a green tire. Thus, the total distance for an operator to move between the two drums per one working day has significantly increased. It is highly desirous to minimize the manual work load for the operators.

Moreover, since the belt drum 01 and the band drum 02 are separated from each other on both sides of the shaping drum 03, it is necessary to provide two transfer units, i.e., a belt transfer unit 04 and a band transfer unit 05. Such an arrangement is complex in structure, relatively expensive and less reliable in operation.

SUMMARY OF THE INVENTION

Therefore, it is an object of the present invention to eliminate the above-mentioned problems and provide an improved tire forming system making it possible to minimize the manual work load for the operators and which is simple in structure, less expensive and highly reliable in operation.

To this end, the present invention provides a tire forming system which includes a belt drum, a band drum and a shaping drum, which are linearly arranged in order on a base from its one end to the other end. The system according to the invention further comprises:

- a first drive means arranged at one end of the base, for coaxially supporting and driving the belt drum and the band drum,
- a belt server and a band server arranged opposite to the belt drum and the band drum, respectively,
- a second drive means arranged at the other end of the base, for supporting and driving the shaping drum,
- a transfer means movable between the belt drum, band drum and shaping drum, for transferring a belt-tread band on the belt drum and a carcass band on the band drum to the shaping drum,
- a stitcher means arranged opposite to the shaping drum, and
- a green tire removing means for removing out of the shaping drum a green tire which has been formed thereon.

With the above-mentioned arrangement of the tire forming system according to the present invention, because the belt drum and the band drum are arranged at one end of the base adjacent to each other, it is possible to minimize the total distance for an operator to move between the two drums per one working day, and hence the manual work load for the operators. Moreover, because the shaping drum is arranged at the other end of the base, it is possible to transfer the belt-tread band and the carcass band from the belt drum and the band drum respectively to the shaping drum by means of a single transfer unit only. This serves to simplify the structure and lower the cost of the system and improve the reliability of the system in operation Preferably, the transfer means is rotatable by an angle of 180° while moving between the belt drum, band drum and shaping drum.

BRIEF DESCRIPTION OF THE DRAWINGS

FIG. 2 is an illustration showing the forming process and procedure performed by the system of FIG. 1; and FIG. 3 is a top plan view showing the arrangement of the prior art system.

DETAILED DESCRIPTION OF THE PREFERRED EMBODIMENT

Figure 1:
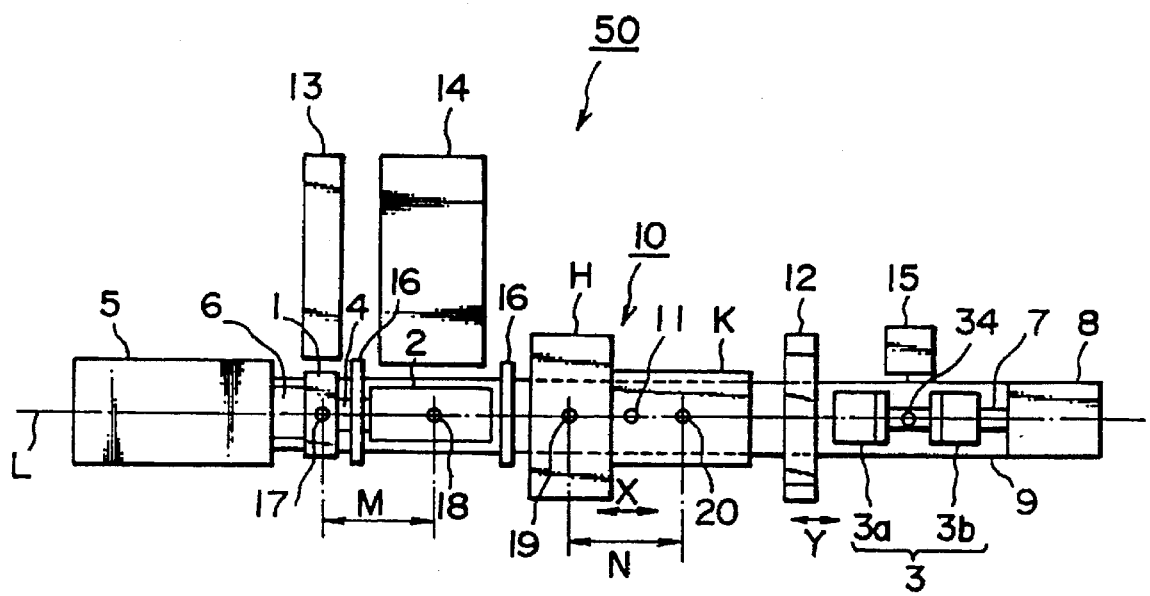
FIG. 1 view of a single-stage tire forming system according to one embodiment of the present invention.

One preferred embodiment of the present invention will now be explained below with reference to FIGS. 1 and 2.

The tire forming system according to the illustrated embodiment includes three forming drums, i.e. a belt drum 1, a band drum 2 and a shaping drum 3, which are linearly arranged in order on a base 9 from one end toward the other end of the base 9, along a common longitudinal axis L. Specifically, the belt drum 1 and the band drum 2 are arranged at one end of the base 9, while the shaping drum 3 is arranged at another end of the base 9.

The band drum 2 is radially expandable or contractible and supported by a drive unit 5 through a shaft 4. Similarly, the belt drum 1 is radially expandable or contractible and supported by the same drive unit 5 through a haft 6 which is coaxial to the shaft 4. To this end, the shaft 6 for the belt drum 1 may be a hollow shaft through which the shaft 4 for the band drum 2 extends. The drive unit 5 for the belt drum 1 and the band drum 2 is arranged at one end of the base 9. The drive unit 5 coaxially supports the belt drum 1 and the band drum 2 and drives the belt drum 1 and the band drum 2 independently of the other, through the respective shafts 4, 6.

The shaping drum 3 comprises right and left half drums 3a and 3b and is supported and driven by another drive unit 8 through a shaft 7. The drive unit 8 for the shaping drum 3 is arranged at the other end of the base 9.

A transfer unit 10 is provided, which is movable toward the left or right between the belt drum 1, the band drum 2 and the shaping drum 3 on the base 9, along the longitudinal axis L as shown by arrow X, while rotating by 180° about a vertical center axis 11. The transfer unit 10 comprises a holder H for holding a belt-tread band which has been formed by the belt drum 1 from the outer periphery, and a holder K for holding a carcass band which has been formed by the band drum 2 from the outer periphery. The distance M between the center 17 of the belt drum 1 and the center 18 of the band drum 2 is equal to the distance N between the center 19 of the holder H and the center 20 of the holder K.

For removing out a green tire which has been formed on the shaping drum 3, there is provided a green tire takeout unit 12 which is movable on the base 9 toward left or right as shown by arrow Y, to take a green tire out of the shaping drum 3.

For supplying the belt drum 1 with various members, such as belts, treads and the like, as members to be wound on the belt drum 1, a belt server 13 is arranged adjacent to the belt drum 1 and extends in a direction perpendicular to the longitudinal axis L. Similarly, for supplying the band drum 2 with various members such as side walls, inner liners, carcass ply and the like, as members to be wound on the band drum 2, a band server 14 is arranged adjacent to the band drum 2 and extends in parallel with the belt server 13, i.e., in a direction perpendicular to the longitudinal axis L.

A stitcher 15 is arranged adjacent to the shaping drum 3, and serves to urge the outer peripheries of the carcass band and the belt-tread band while these bands are assembled on the shaping drum 3 and rotated with the shaping drum 3. Furthermore, a pair of right and left bead setters 16 is arranged adjacent to the band drum 2, for setting a pair of right and left beads to predetermined positions of the carcass band which has been formed by the band drum 2.

The above-described components as a whole constitute a single-stage tire forming system 50 according to the present invention.

The operation of the tire forming system 50 according to the present invention will be described below.

Generally, large-sized tires comprise four or more belts while small-sized tires comprise two belts. By way of example, the operation will be explained with reference to formation of a tire comprising two belts. Also, while more than ten members including various small members are used to form a tire, only main members will be described below in order to facilitate correct understandings. It is further assumed that the transfer unit 10 is situated at a waiting position between the band drum 2 and the shaping drum 3, while holding a belt-tread band and a carcass band which have been formed in a previous cycle.

First, as shown in FIG. 2, the belt formation process A is advanced in order as shown by steps A1, A2, A3 and A4. Thus, each member is supplied to the belt drum 1 from the belt server 13 (FIG. 1); and a first belt 27, a second belt 28 and a tread 29 are stuck on the belt drum 1, and stitched by the stitcher 15 (FIG. 1) below the belt drum 1 to assemble a belt-tread band 25 (step A4).

The bead formation process B is advanced in order as shown by steps B1, B2, B3 and B4, which are carried out substantially simultaneously as the steps A1, A2, A3 and A4 of the belt formation process A. Thus, a pair of right and left beads 30 are supplied to the right and left bead setters 16, respectively, and then each member is supplied from the band server 14 (FIG. 1) for stitching a pair of right and left side walls 31, an inner liner 32 and a carcass ply 33 in order. Subsequently, the right and left bead setters 16 are moved toward each other and the right and left beads 30 are held at predetermined positions at the top of the outer periphery of the carcass ply 33 to assemble a carcass band 26.

The shaping process C is advanced in order as shown by steps C1, C2, C3, C4, and C5. Thus, in a first step C1, the transfer unit 10 is moved from the waiting position D toward the shaping drum 3 as soon as the step A1 in the belt process A starts. The unit 10 is stopped at a position where the center 20 of the holder K holding the carcass band 26 coincides with the center 34 of the shaping drum 3, in order to transfer the carcass band 26 onto the shaping drum 3. Then, the transfer unit 10 is moved back to the waiting position D while rotating by 180° about the vertical axis 11 (step D2). In a subsequent step C2 of the shaping process C, the shaping drum 3 turns up both ends of the carcass band 26 about the bead 30. The transfer unit 10 is then moved from the waiting position D toward the shaping drum 3, and stopped at a position in which the center 19 of the holder H holding the belt-tread band 25 coincides with the center 34 of the shaping drum 3. The shaping drum 3 inflates the carcass band 26 by applying an internal pressure to the band 26, and the transfer unit 10 is then moved back to the waiting position D when the outer periphery of the carcass band 26 contacts the inner periphery of the belt-tread band 25 (step D4). In a subsequent step C4 of the shaping process C, the carcass band 26 is shaped and stitched by the stitcher 15 (FIG. 1) and then is assembled with the belt-tread band 25 so that the bands 26 and 25 are firmly and integrally bonded to each other and finally finished as a green tire 35.

The green tire 35 is then held by the green tire takeout unit 12 and removed from the shaping drum 3. A green tire transfer unit (not shown) automatically transfers the green tire 35 from the green tire takeout unit 12 to the next process. In a subsequent step D5, the transfer unit 10 is rotated by 180° at the waiting position D and moved toward the belt drum 1 and the band drum 2 and stopped at a position where the center 19 of the holder H and the center 20 of the holder K coincide with the center 17 of the belt drum 1 and the center 18 of the band drum 2, respectively. The transfer unit 10 holds the belt-tread band 25 and the carcass band 26 and is then moved back to the waiting position D.

The above-mentioned series of steps constitute one cycle of the green tire formation, and such cycle is repeated.

Further details of the components constituting the tire forming system will be described below.

The belt drum 1 is comprised of a radially expandable and contractible cylindrical drum and has an outer peripheral length which is substantially same as the inner peripheral length of the belt to be cylindrically assembled when the drum is expanded to have an increased diameter, and which is smaller than the inner peripheral length of the assembled belt-tread band 25 when the drum is contracted to have a reduced diameter.

Similarly, the band drum 2 is comprised of a radially expandable and contractible cylindrical drum having a structure wherein the outer peripheral length is changed at three positions, i.e., an increased-diameter position, an intermediate-diameter position and a reduced-diameter position, or at two positions, i.e., an increased-diameter position and a reduced-diameter position. The outer peripheral length of the band drum 2 is substantially same as the inner peripheral length of the carcass band 26 to be cylindrically assembled at the intermediate-diameter position or increased-diameter position. Furthermore, the outer peripheral length of the band drum 2 is smaller than the inner peripheral length of the assembled carcass band 26 when he diameter of the drum is reduced.

The shaping drum 3 is comprised of radially expandable and contractible half drums 3a and 3b having a side bladder for bead-locking the carcass band 26 assembled on the band drum 2 and thereafter turning up the both ends of the carcass band 26 about the bead 30, and for further assembling the belt-tread band 25 which has been formed on the belt drum 1 and transferred onto the carcass band 26 according to predetermined procedures to form the green tire 35.

The holder H of the transfer unit 10 includes radially inwardly retractable segments for enclosing the belt-tread band 25 formed on the belt drum 1 from a radially outer side, and locally or entirely holding the outer surface of the band 25. Similarly, the holder K of the transfer unit 10 includes radially inwardly retractable segments for holding the carcass band 26 formed on the band drum 26 from the outer periphery by using vacuum pads or magnets, and further includes a radially inwardly retractable segment for holding the right and left beads 30 from the outer periphery or outer surface.

The transfer unit 10 may be constituted to simultaneously take the belt-tread band 25 and the carcass band 26 out of the belt drum 1 and the band drum 2, respectively, and to simultaneously transfer them. Alternatively, the transfer unit 10 may be constituted to take out the both bands 25 and 26 independently.

The transfer unit 10 may be mounted on a carriage which is movable on the base 9 along the longitudinal axis L. The carriage may be driven by a pneumatic or hydraulic cylinder or by an electric motor so as to be moved between the belt drum 1, the band drum 2 and the shaping drum 3 while rotating the transfer unit 10 by 180°.

Alternatively, it is possible to transfer the carcass band 26 and the belt-tread band 25 to the shaping drum 3 by moving the transfer unit 10 to the shaping drum 3 by keeping the orientation of the unit 10 as it is, without rotating the unit 10. That is, when the transfer unit 10 is not rotated, the both bands 26 and 25 can be transferred to the shaping drum 3 by increasing the length of the shaft 7 between the drive unit 8 and the half drum 3b, and transferring the belt-tread band 25 to the shaping drum 3 and then stitching the band while shaping it, with the entire transfer unit being temporarily situated at a waiting position in the area of the shaft 7 of the drive unit 8.

The stitcher 15 includes a plurality of rollers and wheels which are urged against the green tire 35 under rotation by drive means to remove air between the rubber members and thereby firmly bonding the rubber members with each other.

The drive unit 5 includes a base member which is capable of rotatably supporting the coaxial shafts 6 and 4 for the belt drum 1 and the band drum 2, respectively, as well as a motor for individually rotating the shafts 6 and 4. Because the belt drum 1 and the band drum 2 are coaxially supported and driven by the drive unit 5, the distance between the center of the belt drum 1 and that of the band drum 2 can be reduced to approximately one meter even for large-sized tires. This means that the total distance along which the operator must move between the belt drum 1 and the band drum 2 per one working day can be significantly decreased.

The drive unit 8 includes a base member capable of rotatably supporting the shaft 7 for the shaping drum 3 which is comprised of the half drums 3a and 3b, as well as a motor for rotating the shaft 7. The drive unit serves also to move the half drums 3a and 3b toward and away from each other.

The bead setter 16 includes a pair of right and left retractable segments for holding a pair of right and left beads 30 from the inside diameter side or the inner surface, which have been set by an operator at the beginning of a tire forming cycle, as well as a drive unit for driving the segments toward and away from each other.

The belt server 13 is capable of supplying a belt, a tread, and a spiral layer which spirally winds a strip member obtained by embedding in rubber organic fiber cords or the like, as rubber members required for assembling the belt-tread band 25 on the belt drum 1. The belt server 13 has four delivery units for supplying four belts as the belt members, and these delivery units can be used in accordance with a necessary number of belts.

The band server 14 is capable of supplying side walls, inner liners, carcass ply, chafers and cushion rubbers, as rubber members required for assembling the carcass band 26 on the band drum 2.

The green tire takeout unit 12 is arranged to cover the lower half of the shaping drum 3, to be movable on the base 9 from the shaping drum 3 toward the opposite side of the drive unit 8 while supporting three circumferential points of the green tire 35, i.e., a bottom point and two side points which are located approximately 80° on left and right sides from the bottom point. The takeout unit 12 has two side supporting portions for the two side points of the green tire 35, and these supporting portions can be moved toward and away from each other, depending upon the size of tires to be formed.

It will be appreciated from the foregoing description that the tire forming system according to the present invention is featured by an arrangement wherein the belt drum and the band drum are arranged at one end of the base adjacent to each other. It is thus possible to minimize the total distance for an operator to move between the two drums per one working day, and hence the manual work load for the operators. Moreover, the shaping drum is arranged at the other end of the base, so that it is possible to transfer the belt-tread band and the carcass band from the belt drum and the band drum respectively to the shaping drum by means of a single transfer unit only. This serves to simplify the structure and lower the cost of the system and improve the reliability of the system in operation While the present invention has been explained with reference to a specific embodiment illustrated in the drawings, various modifications and/or alterations may be made without departing from the scope of the invention as defined in the appended claims.

I claim:

1. A tire forming system comprising; a belt drum, a band drum and a shaping drum, which are linearly arranged in order on a base from one end to another end thereof;

first drive means arranged at one end of the base for coaxially supporting and driving the belt drum and the band drum;

a belt server and a band server arranged opposite to the belt drum and the band drum, respectively;

second drive means arranged at the other end of the base for supporting and driving the shaping drum;

transfer means movable between the belt drum, band drum and shaping drum for transferring a belt-tread band on the belt drum and a carcass band on the band drum to the shaping drum, wherein said transfer means is rotatable about a vertical axis which is perpendicular to said base by an angle of 180° while moving between the belt drum, band drum and shaping drum;

stitcher means arranged opposite to the shaping drum; and green tire takeout means for taking out of the shaping drum a green tire which has been formed thereon.

2. The system of claim 1 wherein said belt drum comprises a radially expandable and contractible cylindrical drum having an outer peripheral length substantially the same as an inner peripheral length of a belt to be assembled into said green tire.

3. The system of claim 1 wherein said band drum comprises a radially expandable and contractible cylindrical drum having a changeable outer peripheral length.

4. The system of claim 1 wherein said shaping drum comprises radially expandable and contractible half drums, each having a side bladder for bead-locking a carcass band assembled on said band drum and then turning up both ends of said carcass band about beads.

5. The system of claim 1 wherein said transfer means comprises a first holder having radially inwardly retractable segments for enclosing a belt-tread band formed on said belt drum.

6. The system of claim 5 wherein said transfer means comprises a second holder having radially inwardly retractable segments for holding a carcass band formed on said band drum.

7. The system of claim 1 wherein said first drive means comprises a base member supporting coaxial shafts for driving said belt drum and said band drum and a source of power for individually rotating said shafts.

8. The system of claim 1 wherein said second drive means comprises a base member supporting a drive shaft for said shaping drum and a source of power for rotating said shaft.

9. The system of claim 1 wherein said green tire takeout means is arranged to cover a lower half of said shaping drum and is moveable on a base from said shaping drum toward said second drive means while supporting said green tire.

* * * * *